US010218911B2

United States Patent
Shen et al.

(10) Patent No.: US 10,218,911 B2
(45) Date of Patent: Feb. 26, 2019

(54) MOBILE DEVICE, OPERATING METHOD OF MOBILE DEVICE, AND NON-TRANSITORY COMPUTER READABLE STORAGE MEDIUM

(71) Applicant: HTC Corporation, Taoyuan (TW)

(72) Inventors: Cheng-Ta Shen, Taoyuan (TW); Wei-Feng Chien, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/465,617

(22) Filed: Mar. 22, 2017

(65) Prior Publication Data

US 2018/0278851 A1    Sep. 27, 2018

(51) Int. Cl.
*H04N 5/232* (2006.01)
*H04N 5/262* (2006.01)
*H04N 5/445* (2011.01)
*G06F 17/30* (2006.01)

(52) U.S. Cl.
CPC ..... *H04N 5/23293* (2013.01); *G06F 17/30017* (2013.01); *G06F 17/3079* (2013.01); *G06F 17/3082* (2013.01); *H04N 5/2628* (2013.01); *H04N 5/44504* (2013.01)

(58) Field of Classification Search
CPC ............ H04N 5/23293; H04N 5/2628; H04N 5/44504; G06F 17/3079; G06F 17/3082; G06F 3/005
USPC ....... 348/333.05, 142–160; 383/28; 382/100, 382/118, 134, 287; 380/28
See application file for complete search history.

(56) References Cited

U.S. PATENT DOCUMENTS

| | | | | |
|---|---|---|---|---|
| 6,191,406 | B1 * | 2/2001 | Nelson | G06K 7/10574 250/208.1 |
| 6,686,919 | B1 * | 2/2004 | Kanetaka | G06T 13/60 345/473 |
| 2007/0019095 | A1 | 1/2007 | Ikehata et al. | |
| 2009/0252370 | A1 * | 10/2009 | Picard | G06T 1/0028 382/100 |
| 2011/0170749 | A1 * | 7/2011 | Schneiderman | G06F 17/30793 382/118 |
| 2012/0092438 | A1 * | 4/2012 | Suarez | H04N 7/15 348/14.03 |
| 2014/0169687 | A1 | 6/2014 | Chen et al. | |

(Continued)

FOREIGN PATENT DOCUMENTS

| | | |
|---|---|---|
| CN | 102821323 A | 12/2012 |
| TW | 201137665 A | 11/2011 |
| TW | 201631960 A | 9/2016 |

OTHER PUBLICATIONS

Corresponding Taiwan office action dated Mar. 14, 2018.
Corresponding extended European search report dated Jun. 4, 2018.

*Primary Examiner* — Marly S Camargo
(74) *Attorney, Agent, or Firm* — CKC & Partners Co., Ltd.

(57) ABSTRACT

An operating method of a mobile device includes capturing a preview image; displaying the preview image; detecting a photograph in the preview image; in response to the photograph being detected in the preview image, searching a video file corresponding to the photograph in a database; and in response to a video file corresponding to the photograph being searched, playing a video of the searched video file over at least a part of the displayed preview image.

17 Claims, 7 Drawing Sheets

(56) References Cited

U.S. PATENT DOCUMENTS

2016/0378292 A1  12/2016 Lu et al.
2017/0206711 A1* 7/2017 Li ........................ G06T 19/006

* cited by examiner

MOBILE DEVICE, OPERATING METHOD OF MOBILE DEVICE, AND NON-TRANSITORY COMPUTER READABLE STORAGE MEDIUM

BACKGROUND

Technical Field

The present disclosure relates to an electronic device, a method, and a non-transitory computer readable storage medium. More particularly, the present disclosure relates to a mobile device, an operating method of the mobile device, and a non-transitory computer readable storage medium.

Description of Related Art

With advances in technology, mobile devices, such as smart phones and tablet computers, are being increasingly used.

A user may use mobile devices to capture photographs and record videos. However, when there are a large number of videos, if the videos are not properly named and/or placed, it is difficult for the user to find a particular video. Thus, a solution is desired.

SUMMARY

One aspect of the present disclosure is related to a method. In accordance with one embodiment of the present disclosure, the method includes capturing a preview image; displaying the preview image; detecting a photograph in the preview image; in response to the photograph being detected in the preview image, searching a video file corresponding to the photograph in a database; and in response to a video file corresponding to the photograph being searched, playing a video of the searched video file over at least a part of the displayed preview image.

In accordance with one embodiment of the present disclosure, the playing video overlays the photograph in the preview image.

In accordance with one embodiment of the present disclosure, the operation of playing the searched video file over at least a part of the displayed preview image includes calculating a corresponding relationship between vertexes of the photograph and vertexes of the video of the searched video file; and playing the video with a shape and a size changed according to the corresponding relationship between the vertexes of the photograph and the vertexes of the video of the searched video file at a position of the photograph in the preview image.

In accordance with one embodiment of the present disclosure, the operation of detecting the photograph in the preview image includes detecting a quadrangle with one or more features in the preview image, in which the one or more features includes a frame, one or more faces, one or more watermarks, one or more timestamps, and/or one or more codes.

In accordance with one embodiment of the present disclosure, the operation of searching a video file corresponding to the photograph includes searching the video file according to a preset connection between the photograph and the video file, one or more watermarks in the photograph, one or more timestamps in the photograph, one or more codes in the photograph, a histogram of the photograph, and/or an image frequency of the photograph.

In accordance with one embodiment of the present disclosure, a shape of the playing video is substantially identical to a shape of the photograph in the preview image.

In accordance with one embodiment of the present disclosure, a size of the playing video is substantially identical to a size of the photograph in the preview image.

Another aspect of the present disclosure is related to a mobile device. In accordance with one embodiment of the present disclosure, the mobile device includes a display component, a capturing component, one or more processing components, memory, and one or more programs. The one or more processing components are electrically connected to the display component and the capturing component. The memory is electrically connected to the one or more processing components. The one or more programs are stored in the memory and configured to be executed by the one or more processing components. The one or more programs include instructions for controlling the capturing component to capture a preview image; controlling the display component to display the preview image; detecting a photograph in the preview image; in response to the photograph being detected in the preview image, searching a video file corresponding to the photograph in a database; and in response to a video file corresponding to the photograph being searched, playing a video of the searched video file over at least a part of the displayed preview image.

In accordance with one embodiment of the present disclosure, the playing video overlays the photograph in the preview age.

In accordance with one embodiment of the present disclosure, the one or more programs further include instructions for calculating a corresponding relationship between vertexes of the photograph and vertexes of the video of the searched video file; and playing the video with a shape and a size changed according to the corresponding relationship between the vertexes of the photograph and the vertexes of the video of the searched video file at a position of the photograph in the preview image.

In accordance with one embodiment of the present disclosure, the one or more programs further include instructions for detecting a quadrangle with one r more features in the preview image in which the one or more features includes a frame, one or more faces, one or more watermarks, one or more timestamps, and/or one or more codes.

In accordance with one embodiment of the present disclosure, the one or more programs further include instructions for searching the video file according to a preset connection between the photograph and the video file, one or more watermarks in the photograph, one or more timestamps in the photograph, one or more codes in the photograph, a histogram of the photograph, and/or an image frequency of the photograph.

In accordance with one embodiment of the present disclosure a shape of the playing video is substantially identical to a shape of the photograph in the preview image.

In accordance with one embodiment of the present disclosure, a size of the playing video is substantially identical to a size of the photograph in the preview image.

Another aspect of the present disclosure is related to a non-transitory computer readable storage medium. In accordance with one embodiment of the present disclosure, the non-transitory computer readable storage medium storing one or more programs includes instructions, which when executed, causes one or more processing components to perform operations including: capturing a preview image; displaying the preview image; detecting a photograph in the preview image; in response to the photograph being detected in the preview image, searching a video file corresponding to the photograph in a database; and in response to a video file corresponding to the photograph being searched, playing a video of the searched video file over at least a part of the displayed preview image.

In accordance with one embodiment of the present disclosure, the playing video overlays the photograph in the preview image.

In accordance with one embodiment of the present disclosure, the non-transitory computer readable storage medium including instructions, which when executed, causes one or more processing components to further perform operations including calculating a corresponding relationship between vertexes of the photograph and vertexes of the video of the searched video file; and playing the video with a shape and a size changed according to the corresponding relationship between the vertexes of the photograph and the vertexes of the video of the searched video file at a position of the photograph in the preview age.

In accordance with one embodiment of the present disclosure, the non-transitory computer readable storage medium including instructions, which when executed, causes one or more processing components to, further perform, operations including detecting a quadrangle with one or more features in the preview image, in which the one or more features includes a frame, one or more faces, one or more watermarks, one or more timestamps, and/or one or more codes.

In accordance with one embodiment of the present disclosure, the non-transitory computer readable storage medium including instructions, which when executed, causes one or more processing components to further perform operations including searching the video file according to a preset connection between the photograph and the video file, one or more watermarks in the photograph, one or more timestamps in the photograph, one or more codes in the photograph, a histogram of the photograph, and/or an image frequency of the photograph.

In accordance with one embodiment of the present disclosure, a shape of the playing video is substantially identical to a shape of the photograph in the preview image, and/or a size of the playing video is substantially identical to a size of the photograph in the preview image.

Through the operations of one embodiment described above, the video file corresponding to the photograph in the preview image can be rapidly played in the preview image, and it is not necessary for the user to manually find the corresponding video file.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
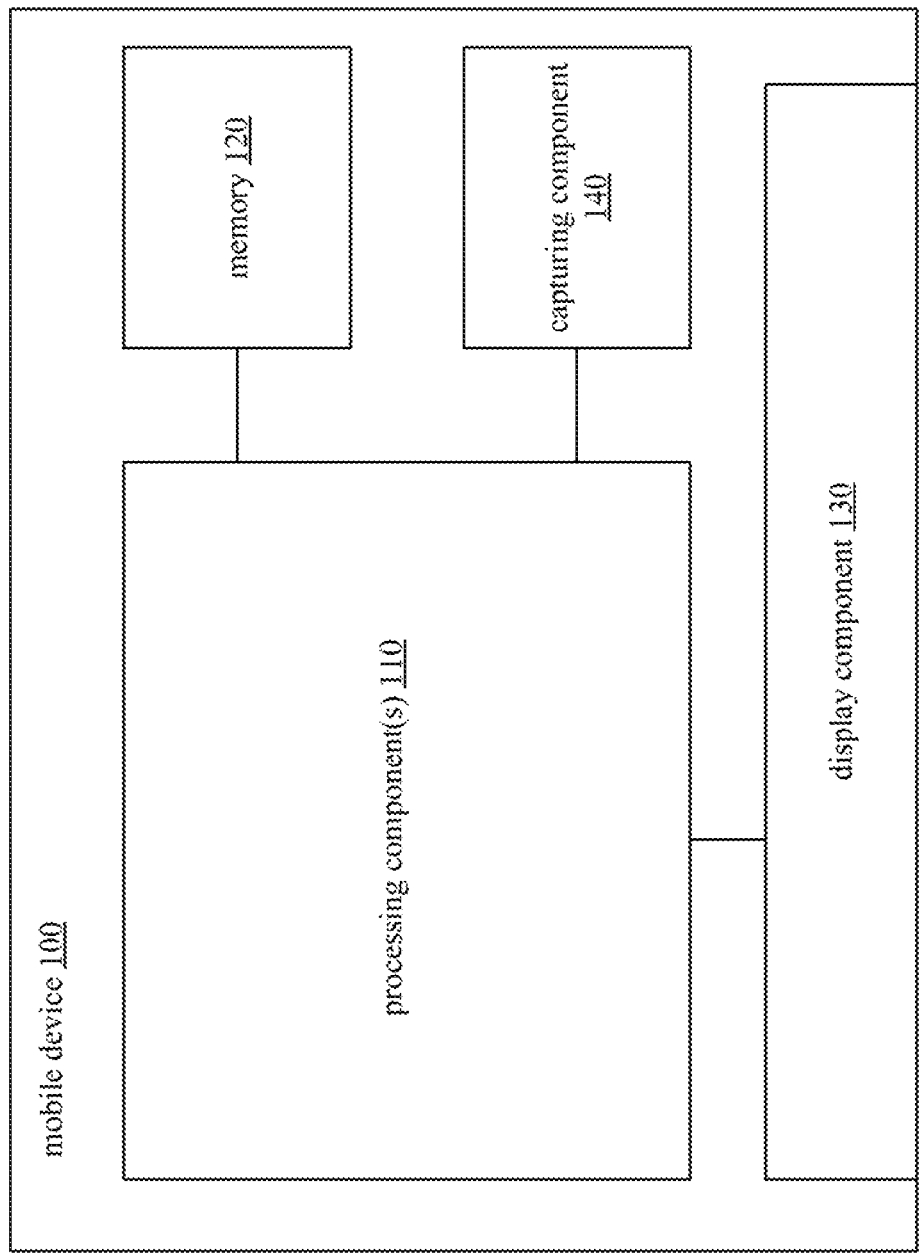
FIG. 1 is a schematic block diagram of a mobile device in accordance with one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for station and do not limit the present disclosure.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "mean for" performing a specified function or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

One aspect of the present disclosure is related to a mobile device. In the paragraphs below, a smart phone will be taken as an example to describe details of the mobile device.

However another mobile device, such as a tablet computer, an augmented reality (AR) device, and smart glasses is within the contemplated scope of the present disclosure.

FIG. 1 is a schematic block diagram of a mobile device 100 in accordance with one embodiment of the present disclosure. In this embodiment, the mobile device 100 includes one or more processing components 110, a memory 120, a display component 130, and a capturing component 140. In this embodiment, the processing component 110 is electrically connected to the memory 120, the display component 130, and the capturing component 140.

In one embodiment, the one or more processing components 110 can be realized by, for example, one or more processors, such as central processors and/or microprocessors, but are not limited in this regard. In one embodiment, the memory 120 includes one or more memory devices, each of which comprises, or a plurality of which collectively comprise a computer readable storage medium. The memory 120 may include a read-only memory (ROM), a flash memory, a floppy disk, a hard disk, an optical disc, a flash disk, a flash drive, a tape, a database accessible from a network, or any storage medium with the same functionality that can be contemplated by persons of ordinary skill in the art to which this invention pertains. The display component 130 can be realized by, for example, a display, such as a liquid crystal display or an active matrix organic light emitting diode (AMOLED) display, but is not limited in this regard. The capturing component 140 can be realized by, for example, a camera.

In one embodiment, the one or more processing components 110 may run or execute various software programs and/or sets of instructions stored in the memory 120 to perform various functions for the mobile device 100 and to process data.

In one embodiment, the capturing component 140 may capture a real-time preview image corresponding to a real environment, and provide the preview image to the one or more processing components 110. In one embodiment, the one or more processing components 110 may control the display component 130 to display the preview image. In one embodiment, the one or more processing components 110 may determine whether one or more photographs are captured by the capturing component 140. That is, the one or more processing components 110 may determine whether one or more photographs are present in the preview image. If so, the one or more processing components 110 may search one or more video files corresponding to the one or more photographs in the preview image, and play one or more videos of the one or more searched video files over at least a part of the displayed preview image.

Through such a configuration, a user can watch one or more certain videos by merely taking the mobile device 100 in front of one or more physical or digital photographs and using the capturing component 140 to take a real-time preview image corresponding to the physical or digital photographs, and this is both convenient and entertaining for the user.

In some embodiments, the one or more videos of each of the one or more searched video files may be displayed over the corresponding photograph in the preview image with a position, a shape, and a size identical to a position, a shape, and a size of the corresponding photograph.

Through such a configuration, it appears as if the static photograph in the preview image becomes dynamic, and this is entertaining for the user.

Details of the present disclosure are described in the paragraphs below with reference to an operating method in FIG. 2. However, the present disclosure is not limited to the embodiment below.

It should be noted that the operating method can be applied to a mobile device having a structure that is the same as or similar to the structure of the mobile device 100 shown in FIG. 1. To simplify the description below, the embodiment shown in FIG. 1 will be used as an example to describe the operating method according to an embodiment of the present disclosure. However, the present disclosure is not limited to application to the embodiment shown in FIG. 1.

It should be noted that, in some embodiments, the operating method may be implemented as a computer program. When the computer program is executed by a computer, an electronic device, or the one or more processing components 110 in FIG. 1, this executing device performs the operating method. The computer program can be stored in a non-transitory computer readable medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this invention pertains.

In addition, it should be noted that in the operations of the following operating method, no particular sequence is required unless otherwise specified. Moreover, the following operations also may be performed simultaneously or the execution times thereof may at least partially overlap.

Furthermore, the operations of the following operating method may be added to, replaced, and/or eliminated as appropriate, in accordance with various embodiments of the present disclosure.

Figure 2:
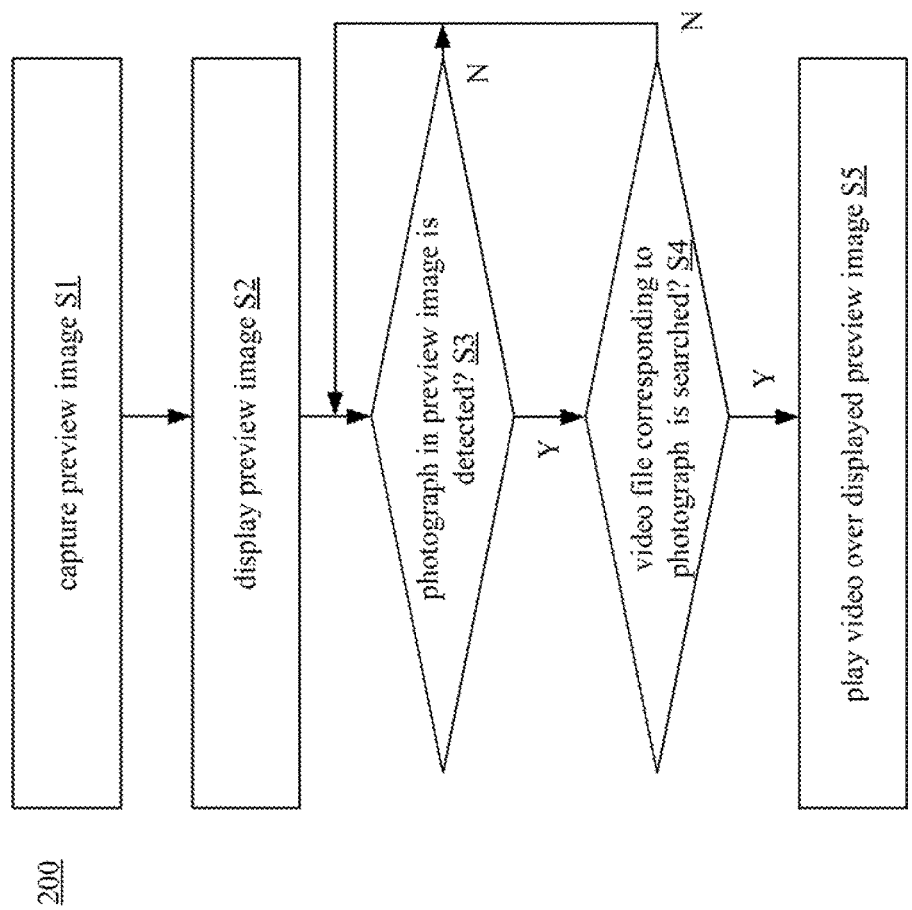
FIG. 2 is a flowchart of an operating method in accordance with one embodiment of the present disclosure.

Reference is made to FIGS. 1 and 2. The operating method 200 includes the operations below.

In operation S1, the one or more processing components 110 control the capturing component 140 to capture a preview image. In one embodiment, the preview image is a real-time preview image corresponding to a real environment.

In operation S2, the one or more processing components 110 control the display component 130 to display the preview image. In one embodiment, the preview image is displayed on the display component 130 corresponding to the real environment real-timely. That is, when an object appears in the real environment captured by the capturing component 140, the object will appear in the displayed preview image real-timely.

In operation S3, the one or more processing components 110 detect a photograph in the preview image, to determine whether the preview image contains a photograph. If so, operation S4 will be performed. If not, operation S3 will be continuously performed.

In one embodiment, the one or more processing components 110 may detect a photograph in the preview image by detecting a quadrangle with one or more features in the preview image. In one embodiment, the one or more features may include a frame, one or more faces, one or more watermarks, one or more timestamps, one or more codes (e.g., bar codes, or 2D codes such as QR codes), and any combination thereof. For example, the one or more features may be may be a face and a predetermined watermark.

In one embodiment, the frame may be a blank surrounding the photograph.

In one embodiment, the one or more watermarks may be a particular image or pattern located anywhere on the photograph. For example, the one or more watermarks may be a logo with a serial number located at a corner of the photograph, but the present disclosure is not limited in this regard.

In one embodiment, the one or more timestamps may indicate times when the photograph is captured, stored, modified, and/or printed, but the present disclosure is not limited in this regard. For example, the one or more timestamps may be a string corresponding to a particular time such as "01/01/2017 16:32" located at a corner of the photograph.

In one embodiment, the one car more codes may be barcodes or 2D codes. For example, the one or more codes may be one or more barcode located at a frame of the photograph, which surrounds the photograph, but the present disclosure is not limited in this regard.

In one embodiment, under a condition that a quadrangle with a face, a watermark, a timestamp, or a code is detected in the preview image, the one or more processing components 110 may determine that a photograph in the preview image is detected. Under a condition that a quadrangle with any one of a face, a watermark, a timestamp, or a code is not detected in the preview image, the one or more processing components 110 may determine that a photograph in the preview image is not detected.

It should be noted that other criteria to determine whether a photograph is in the preview image are within the contemplated scope of the present disclosure.

In one embodiment, the one or more processing components 110 may detect a quadrangle with a face, a watermark, a timestamp, and/or a code by performing a computer vision algorithm (e.g., a face recognition algorithm, a feature detection algorithm, and so on). However, another detection method is within the contemplated scope of the present disclosure.

In operation S4, in response to detecting the photograph in the preview image, the one or more processing components 110 search for a video file corresponding to the photograph in a database. If a video file corresponding to the photograph in the database is searched (i.e., the database contains a video file corresponding to the photograph), operation S5 will be performed. If not, the procedure will go back to operation S3.

In one embodiment, the database may store a plurality of video files. In one embodiment, the video files may be ZOE video files, but the present disclosure is not limited in this regard. In one embodiment, the database may be stored in the memory 120, another interior storage, and/or an external storage (e.g., cloud storage).

In one embodiment, the one or more processing components 110 may search the video file corresponding to the photograph according to a preset connection between the photograph and the video file, one or more watermarks in the photograph, one or more features in the photograph, one or more timestamps in the photograph, one or more codes in the photograph, a histogram of the photograph, and/or an image frequency of the photograph.

In one embodiment, a connection between the photograph and one of the video files may be preset. In one embodiment, when a capture time of the photograph is substantially identical to or close to a capture time of a video of one of the video files, a connection therebetween may be set. In one embodiment, when the photograph and a video of one of the video files are taken in a same operation (e.g., an operation to take a photograph and a video simultaneously), a connection therebetween may be set. In one embodiment, when a filename of the photograph corresponds to one of the video files, a connection therebetween may be set. In one embodiment, a user may also manually set a connection between the photograph and one of the video files. According to the preset connection, the one or more processing components 110 can search the one of the video files corresponding to the photograph.

It should be noted that other ways to set a connection between the photograph and one of the video files are within the contemplated scope of the present disclosure.

In one embodiment, the photograph may have one or more watermarks thereon. The one or more watermarks may correspond to one of the video files, so that the one or ore processing components 110 can search the one of the video files corresponding to the photograph according to the one or more watermarks.

In one embodiment, the photograph may have one or more timestamps thereon. The one or more timestamps may correspond to one or more certain time points. The one or more processing components 110 may take one of the video files corresponding to the one or more certain time points as the searched video file. For example, the one or more processing components 110 may take one of the video files having an establish time substantially identical to or close to the one or more certain time points as the searched video file.

In one embodiment, the photograph may have one or more codes thereon. In one embodiment, the one or more codes may correspond to one of the video files (e.g., containing information of a filename, a file position of a certain video file, a serial number, and so on), so that the one or more processing components 110 can search the one of the video files corresponding to the photograph according to the one or more codes.

In one embodiment, the one or more processing components 110 can analyze the photograph to acquire a histogram of the photograph. The one or more processing components 110 can analyze the video frames in videos of the video files in the database to acquire histograms of the video frames in the videos of the video files, in which the video frames indicate still images in the video. Subsequently, the one or more processing components 110 can compare the histogram of the photograph with the histograms of the video frames in the videos of the video files, and take one of the video files having one or more histograms substantially identical to or similar with the histogram of the photograph as the searched video file.

In one embodiment, the one or more processing components 110 can analyze the photograph (e.g., performing a Fourier transform with respect to the photograph) to acquire an image frequency of the photograph. The one or more processing components 110 can analyze the video frames in videos of the video files in the database to acquire image frequencies of the video frames in the videos of the video files. Subsequently, the one or more processing components 110 can compare the image frequency of the photograph with the image frequencies of the video frames in the videos of the video files, and take one of the video files having one or more image frequencies substantially identical to or similar with the image frequency of the photograph as the searched video file.

In operation S5, in response to a video file corresponding to the photograph being searched, the one or more processing components 110 play the video of the searched video file over at least a part of the displayed preview image.

In one embodiment, the one or more processing components 110 control the display component 130 to display the playing video over the displayed preview image.

In one embodiment, the one or more processing components 110 detect a position, a shape, and a size of the photograph in the preview image, and make the playing video overlay the photograph in the preview image according to the position, the shape, and the size of the photograph in the preview image. In one embodiment, a shape of the playing video is substantially identical to the shape of the photograph in the preview image. In one embodiment, a size of the playing video is substantially identical to the size of the photograph in the preview image. In one embodiment a position of the playing video is substantially identical to the position of the photograph in the preview image.

Figure 3:
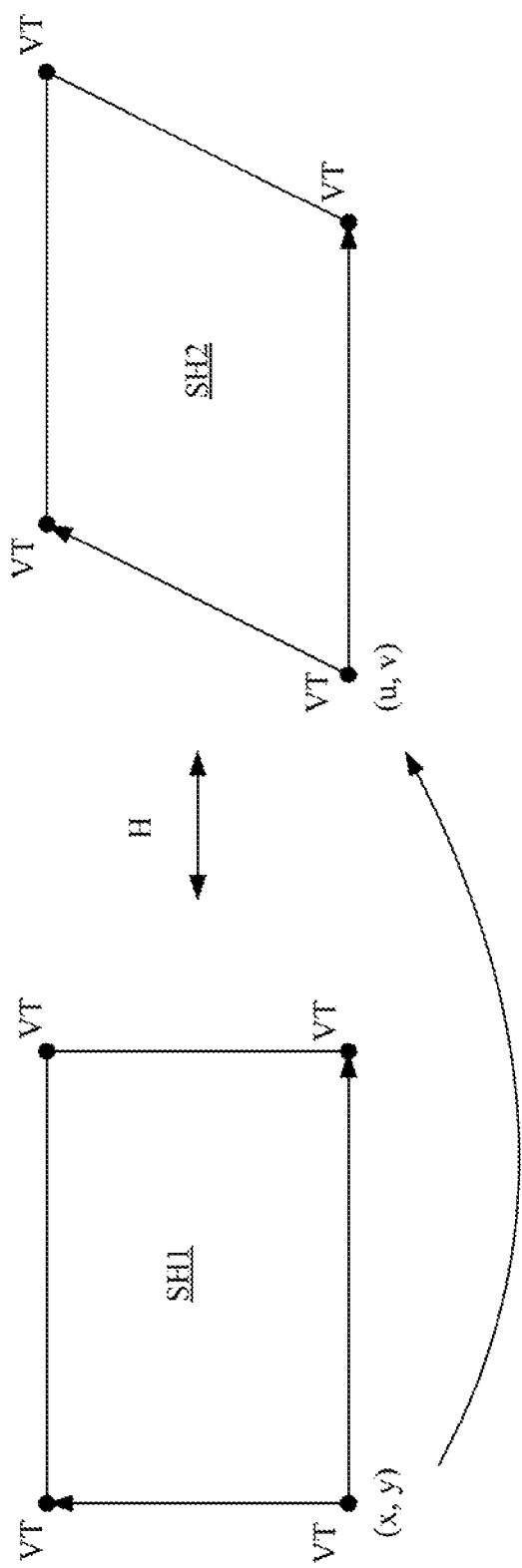
FIG. 3 illustrates a photograph in a preview image and a video in accordance with one embodiment of the present disclosure.

Referring to FIG. 3, in one embodiment, the photograph SH2 in the preview image may be in the shape of a parallelogram, and the video SH1 of the searched video file may be rectangular in shape.

In one embodiment, the one or more processing components 110 acquire vertexes VT of the photograph SH2 and vertexes VT of the video SH1 of the searched video file. Subsequently, the one or more processing components 110 calculate a corresponding relationship between the vertexes VT of the photograph SH2 and the vertexes VT of the video SH1 of the searched video file.

In this embodiment, each frame of the searched video and the preview image are related by an image coordinate transformation called a homography, which can be described by a 3×3 matrix H. Each vertex VT $(x_i, y_i)$ of the video SH1 of the searched video file can be presented by a vector $[x_i\ y_i\ 1]^T$, where i=0, ..., 3, which is multiplied by H yield the vector $[u_i\ v_i\ w_i]^T$. Each vertex VT $(x'_i, y'_i)$ of photograph SH2 in the preview image can be presented by a vector $[x'_i\ y'_i\ 1]^T$, where i=0, ..., 3. The matrix H can be solved by the following expressions.

$$\begin{bmatrix} u \\ v \\ 1 \end{bmatrix} = \begin{bmatrix} h00 & h01 & h02 \\ h10 & h11 & h12 \\ h20 & h21 & h22 \end{bmatrix} \begin{bmatrix} x \\ y \\ 1 \end{bmatrix}$$

The resulting components $[u_i\ v_i\ w_i]^T$ is divided by w yielding the vertex VT $(x'_i, y'_i)$ of photograph SH2 in the preview image:

$$u = \frac{xh00 + yh01 + h02}{xh20 + yh21 + h22}$$

$$v = \frac{xh10 + yh11 + h12}{xh20 + yh21 + h22}$$

These equations can be rewritten in matrix form:

$$\begin{bmatrix} xy1000 - ux - uy - u \\ 000xy1 - vx - vy - v \\ \vdots \end{bmatrix} \begin{bmatrix} h00 \\ h01 \\ h02 \\ h10 \\ h11 \\ h12 \\ h20 \\ h21 \\ h22 \end{bmatrix} = \begin{bmatrix} 0 \\ 0 \\ \vdots \end{bmatrix}$$

Supposed that $\begin{bmatrix} xy1000 - ux - uy - u \\ 000xy1 - vx - vy - v \\ \vdots \end{bmatrix} = A$, and $\begin{bmatrix} h00 \\ h01 \\ h02 \\ h10 \\ h11 \\ h12 \\ h20 \\ h21 \\ h22 \end{bmatrix} = H$ $AH = 0$ Therefore, the homography H can be obtained by solving AH=0 system, that is, H=eigenvector of $A^T A$ with respect to the smallest eigenvalue.

After the matrix H is solved, the one or more processing components 110 can convert a shape and a size of the video SH1 of the searched video file to a shape and a size identical to the shape and the size of the photograph SH2 in the preview image according to the corresponding relationship between the vertexes VT of the photograph and the vertexes VT of the video of the searched video file (i.e., the matrix H). Subsequently, the one or more processing components 110 can play the video of the searched video file with the converted shape, and size at the position of the photograph in the preview image.

Through such a configuration, it appears as if like the static photograph in the preview image becomes dynamic, and this is entertaining for the user.

It should be noted that, in some embodiments, in operation S4, more than one video file corresponding to the photograph may be searched. Under such a condition, in operation S5, the one or more processing components 110 may play the videos of the searched video files sequentially. Additionally, in some embodiments, part or all of the videos of the searched video files can be played with the converted shape and size at a position of the photograph in the preview image as described above.

Additionally, it should be noted that there may exist more than one photograph in the preview image. Under such a condition, in operation S4, the one or more processing components 110 may search one or more video files corresponding to each of the photographs in the preview image. Subsequently, in operation S5, the one or more processing components 110 may concurrently play the videos of the searched video files in the preview image. Additionally, in some embodiments, each of the videos of the searched video files can be played with the converted shape and size at a position of the corresponding photograph in the preview image as described above.

For example, the preview image may include a first photograph corresponding to a first video file and a second photograph corresponding to a second video file. The first photograph and the second photograph have different shapes, sizes, and/or positions, in the preview image. The video of the first video file can be played with a shape, a size, and a position identical to the shape, the size, and the position of the first photograph, and concurrently the video of the second video file can be played with a shape, a size, and a position identical to the shape, the size, and the position of the second photograph.

To allow the disclosure to be more fully understood, illustrative examples are described in the paragraphs below, but the present disclosure is not limited to the examples below.

Figure 4A:
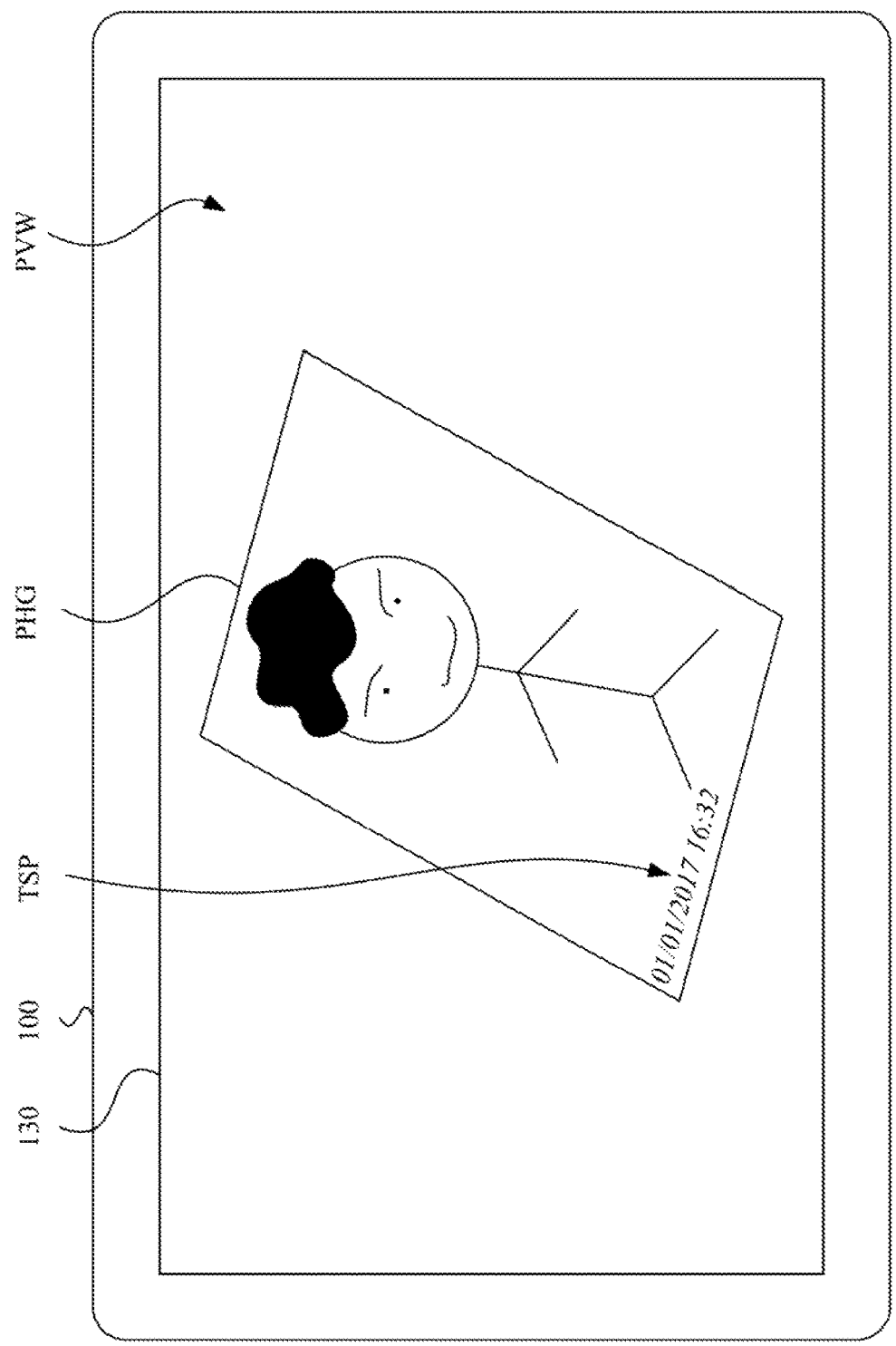
FIGS. 4A-4C illustrate an illustrative example of an operating method in accordance with one embodiment of the present disclosure.
Figure 4B:
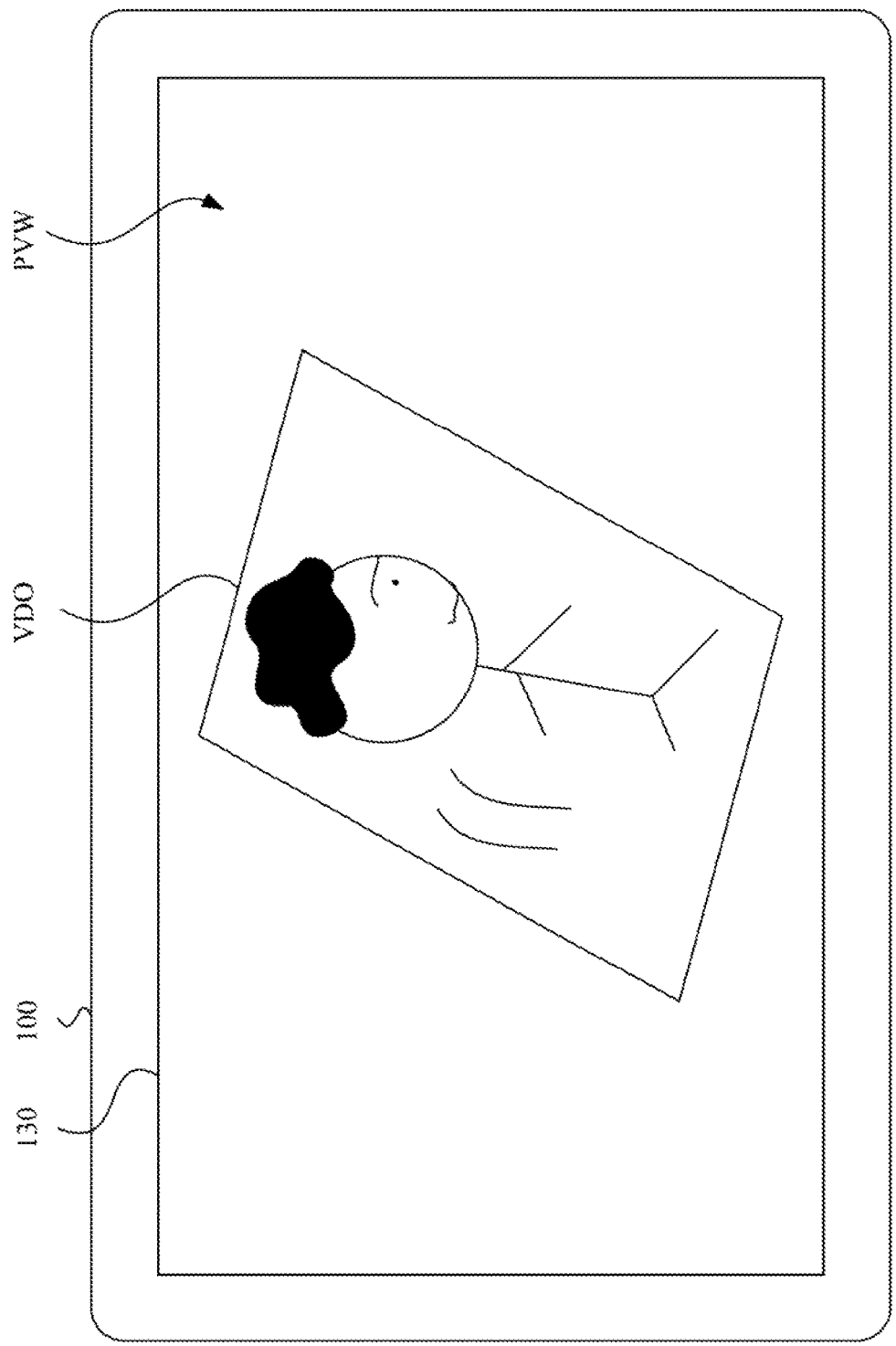
Figure 4C:
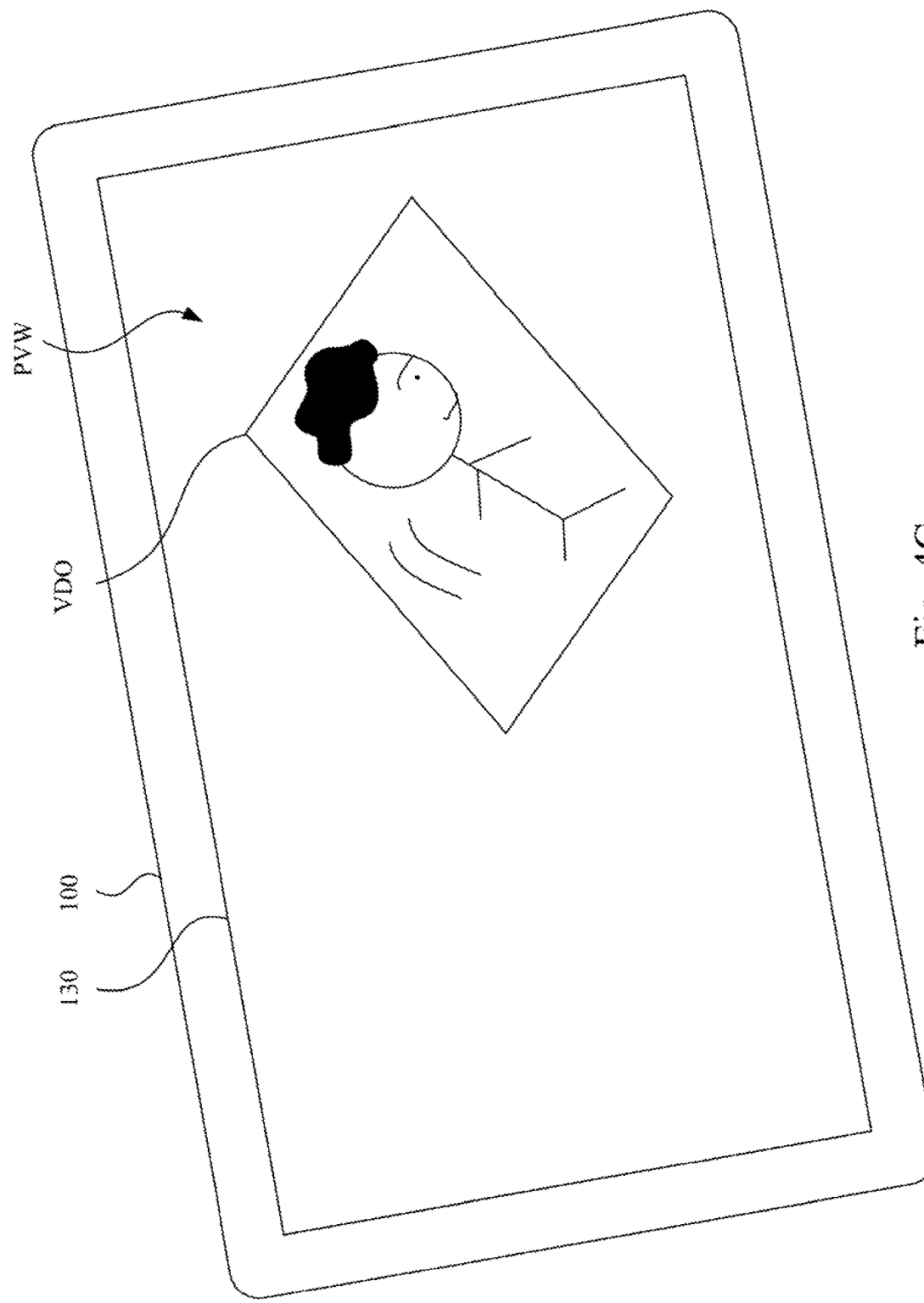

Reference is made to FIGS. 4A-4C. In this illustrative example, the preview image PVW includes a photograph PHG with a timestamp TSP. The one or more processing components 110 control the capturing component 140 to capture the preview image PVW, and also perform control to display the preview image PVW on the display component 130.

The one or more processing components 110 detect a quadrangle with a timestamp TSP, and determine that there is a photograph in the preview image PVW.

Subsequently, the one or more processing components 11 search a video file corresponding to the timestamp TSP in a ZOE video database. In this illustrative example, the one or more processing components 110 take a video the with an establish time (e.g., 01/01/2017 16:30) that is substantially identical or dose to (e.g., within a predetermined period such as 5 minutes) the time point of the timestamp TSP as the searched video file.

Subsequently, the one or more processing components 110 play a video VDO of the searched video file over the photograph PHG in the displayed preview image PVW on the display component 130 (see FIG. 4B). In this illustrative example, the video VDO of the searched video file has a position, a shape, and a size identical to a position, a shape, and a size of the photograph PHG in the preview image PVW.

In this illustrative example, the one or more processing components 110 detect the position, the shape, and the size of the photograph PHG in the preview image PVW real-timely (e.g. calculate the matrix H described above in real time), so that even if the position, the shape, and/or the size of the photograph PHG in the preview image PVW are changed (e.g., due to the moving of the mobile device 100 or the moving of the photograph in the real environment), the one or more processing components 110 can still play the video VDO of the searched video file on the changed photograph PHG with the position, the shape, and the size identical to the position, the shape, and the size of the changed photograph PHG in the preview image PVW (see FIG. 4C).

Through such a configuration, it appears as if the static photograph in the preview image becomes dynamic, and this is entertaining for the user.

Figure 5:
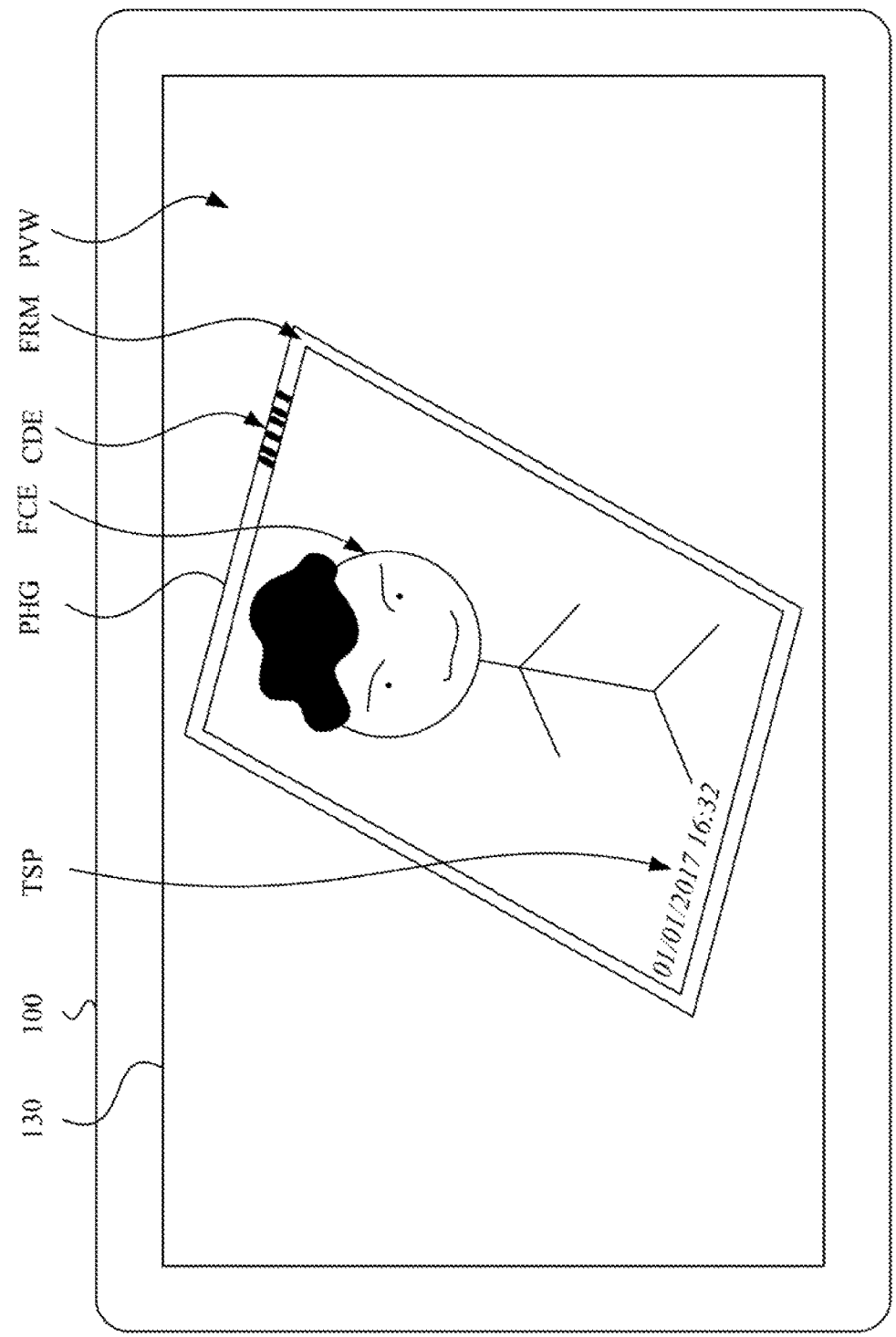
FIG. 5 illustrates an illustrative example of an operating method in accordance with one embodiment of the present disclosure.

Reference is made to FIG. 5. In another illustrative example, the preview image PVW includes a photograph PHG with a time tamp TSP, a face FCE, and a code CDE on a frame FRM of the photograph PHG.

In this illustrative example, the one or more processing components 110 detect a quadrangle with a timestamp TSP, a face FCE, and/or a code CDE on the frame FRM of the photograph PHG, and determine that there is a photograph in the preview image PVW.

Subsequently, the one or more processing components 110 may analyze the code CDE, and acquire information corresponding to a video file according to the code CDE (e.g., the information contains a filename of the video file). Subsequently, the one or more processing components 110 may play a video of the video file corresponding the code CDE over the displayed preview image PVW on the display component 130.

In one embodiment, the watermark, the timestamp, or the code includes information corresponds to one or more time periods of the video file corresponding to the photograph. In one embodiment, the one or more time periods of the video file may be selected by the user. In one embodiment, the one or more processing components 110 play one or more video segments in the one or more time periods of the video file corresponding to the photograph over the displayed preview image.

In one embodiment, the watermark, the timestamp, or the code includes two parts. The first part of the watermark, the timestamp, or the code corresponds to a video file within the database, and the second part of the watermark, the timestamp, or the code corresponds to one or more time periods selected by the user. The one or more processing components 110 search the video file corresponding to the photograph in the database according to the first part, and determine one or more time periods of the video that will be played over the displayed preview image according to the second part.

For example, when the first part of the watermark, the timestamp, or the code corresponds to a video file "$10^{th}$ wedding anniversary" in the database, and the second part of the watermark, the timestamp, or the code corresponds to time periods [0:11:20-0:14:21] and [0:15:25-0:15:22] which are selected by the user, the one or more processing components 110 play the video segments in time periods [0:11:20-0:14:21] and [0:15:25-0:15:22] of the video file "$10^{th}$ wedding anniversary" over at least a part of the displayed preview image.

It should be noted that in one embodiment, the information of the video file corresponding to the photograph may be found in one of the one or more features, and the information corresponding to one or more of the time periods described above may be found in another one of the one or more features, and the disclosure is not limited by the embodiment described above.

Although the present invention has been described in considerable detail with reference to certain embodiments thereof, other embodiments are possible. Therefore, the scope of the appended claims should not be limited to the description of the embodiments contained herein.

What is claimed is:

1. A method comprising:
    capturing a preview image;
    displaying the preview image;
    detecting a photograph in the preview image;
    in response to the photograph being detected in the preview image, searching a video file corresponding to the photograph in a database; and
    in response to a video file corresponding to the photograph being searched, playing a video of the searched video file over at least a part of the displayed preview image,
    wherein the operation of playing the searched video file over at least a part of the displayed preview image comprises:
    calculating a corresponding relationship between vertexes of the photograph and vertexes of the video of the searched video file; and
    playing the video with a shape and a size changed according to the corresponding relationship between the vertexes of the photograph and the vertexes of the video of the searched video file at a position of the photograph in the preview image.

2. The method as claimed in claim 1, wherein the playing video overlays the photograph in the preview image.

3. The method as claimed in claim 1, wherein the operation of detecting the photograph in the preview image comprises:
  detecting a quadrangle with one or more features in the preview image, wherein the one or more features comprise a frame, one or more faces, one or more watermarks, one or more timestamps, and/or one or more codes.

4. The method as claimed in claim 1, wherein the operation of searching a video file corresponding to the photograph comprises:
  searching the video file according to a preset connection between the photograph and the video file, one or more watermarks in the photograph, one or more timestamps in the photograph, one or more codes in the photograph, a histogram of the photograph, and/or an image frequency of the photograph.

5. The method as claimed in claim 1, wherein a shape of the playing video is substantially identical to a shape of the photograph in the preview image.

6. The method as claimed in claim 1, wherein a size of the playing video is substantially identical to a size of the photograph in the preview image.

7. A mobile device comprising:
  a capturing circuit;
  a display component;
  one or more processing circuit electrically connected to the capturing component and the display component;
  a memory electrically connected to the one or more processing circuit; and
  one or more programs, wherein the one or more programs are stored in the memory and configured to be executed by the one or more processing circuit, the one or more programs comprising instructions for:
    controlling the capturing component to capture a preview image;
    controlling the display component to display the preview image;
    detecting a photograph in the preview image;
    in response to the photograph being detected in the preview image, searching a video file corresponding to the photograph in a database; and
    in response to a video file corresponding to the photograph being searched, playing a video of the searched video file over at least a part of the displayed preview image,
  wherein the one or more programs further comprise instructions for:
  calculating a corresponding relationship between vertexes of the photograph and vertexes of the video of the searched video file; and
  playing the video with a shape and a size changed according to the corresponding relationship between the vertexes of the photograph and the vertexes of the video of the searched video file at a position of the photograph in the preview image.

8. The mobile device as claimed in claim 7, wherein the playing video overlays the photograph in the preview image.

9. The mobile device as claimed in claim 7, wherein the one or more programs further comprises instructions for:
  detecting a quadrangle with one or more features in the preview image, wherein the one or more features comprise a frame, one or more faces, one or more watermarks, one or more timestamps, and/or one or more codes.

10. The mobile device as claimed in claim 7, wherein the one or more programs further comprise instructions for:
  searching the video file according to a preset connection between the photograph and the video file, one or more watermarks in the photograph, one or more timestamps in the photograph, one or more codes in the photograph, a histogram of the photograph, and/or an image frequency of the photograph.

11. The mobile device as claimed in claim 7, wherein a shape of the playing video is substantially identical to a shape of the photograph in the preview image.

12. The mobile device as claimed in claim 7, wherein a size of the playing video is substantially identical to a size of the photograph in the preview image.

13. A non-transitory computer readable storage medium storing one or more programs comprising instructions, which when executed, causes one or more processing components to perform operations comprising:
  capturing a preview image;
  displaying the preview image;
  detecting a photograph in the preview image;
  in response to the photograph being detected in the preview image, searching a video file corresponding to the photograph in a database; and
  in response to a video file corresponding to the photograph being searched, playing a video of the searched video file over at least a part of the displayed preview image,
  wherein the operation of playing the video of the searched video file over the at least a part of the displayed preview image comprises:
  calculating a corresponding relationship between vertexes of the photograph and vertexes of the video of the searched video file; and
  playing the video with a shape and a size changed according to the corresponding relationship between the vertexes of the photograph and the vertexes of the video of the searched video file at a position of the photograph in the preview image.

14. The non-transitory computer readable storage medium as claimed in claim 13, wherein the playing video overlays the photograph in the preview image.

15. The non-transitory computer readable storage medium as claimed in claim 13 comprising instructions, which when executed, causes one or more processing components to further perform operations comprising:
  detecting a quadrangle with one or more features in the preview image, wherein the one or more features comprise a frame, one or more faces, one or more watermarks, one or more timestamps, and/or one or more codes.

16. The non-transitory computer readable storage medium as claimed in claim 13 comprising instructions, which when executed, causes one or more processing components to further perform operations comprising:
  searching the video file according to a preset connection between the photograph and the video file, one or more watermarks in the photograph, one or more timestamps in the photograph, one or more codes in the photograph, a histogram of the photograph, and/or an image frequency of the photograph.

17. The non-transitory computer readable storage medium as claimed in claim 13, wherein a shape of the playing video is substantially identical to a shape of the photograph in the preview image, and/or a size of the playing video is substantially identical to a size of the photograph in the preview image.

* * * * *